United States Patent [19]
Kato et al.

[11] Patent Number: 6,000,751
[45] Date of Patent: Dec. 14, 1999

[54] SEAT ARRANGEMENT FOR VEHICLES

[75] Inventors: Hisatoyo Kato, Seto; Takao Okonogi, Nissin, both of Japan

[73] Assignee: Aisin Seiki Kabushiki Kaisha, Kariya, Japan

[21] Appl. No.: 09/140,348

[22] Filed: Aug. 26, 1998

[30]      Foreign Application Priority Data

Aug. 29, 1997   [JP]   Japan ................................... 9-247596

[51] Int. Cl.⁶ ..................................................... B60N 1/02
[52] U.S. Cl. ...................... 297/15; 297/377; 297/354.13; 297/378.1; 296/65.16; 296/69
[58] Field of Search ................................. 297/15, 378.1, 297/378.12, 377, 354.13; 296/65.16, 65.17, 66, 69

[56]               References Cited

U.S. PATENT DOCUMENTS

| | | | |
|---|---|---|---|
| 3,097,881 | 7/1963 | Aguilar | 296/66 |
| 3,746,389 | 7/1973 | Fourrey | 297/15 |
| 4,573,225 | 3/1986 | Wolf | 296/69 |
| 5,527,087 | 6/1996 | Takeda et al. | 297/15 |
| 5,605,368 | 2/1997 | Noma et al. | 296/69 |

FOREIGN PATENT DOCUMENTS

| | | | |
|---|---|---|---|
| 6-219197 | 8/1994 | Japan . | |
| 7-27239 | 6/1995 | Japan . | |
| 7-257256 | 10/1995 | Japan . | |
| 623528 | 5/1949 | United Kingdom | 297/15 |

*Primary Examiner*—Anthony D. Barfield
*Attorney, Agent, or Firm*—Burns, Doane, Swecker & Mathis, LLP

[57]             ABSTRACT

An extra seat back 7 is arranged behind a regular seat 4, 5 of a vehicle in such a manner that the extra seat back 7 can take a first position embedded in a recess of a luggage floor, a second position rised up from the luggage floor, and a third position of a full-flat state.

7 Claims, 4 Drawing Sheets

6,000,751

1

SEAT ARRANGEMENT FOR VEHICLES

BACKGROUND OF THE INVENTION

The present invention relates to a seat arrangement for vehicles and, more particularly, to a seat arrangement which includes an extra or spare seat back located backward of a rear seat for use on the automotive vehicles, particularly on van or micro-bus type compact car.

In a conventional vehicle such as van type vehicle, a rear seat is arranged in such a manner that a seat back thereof can be tilted rearwardly onto a floor of the vehicle body in order to keep a large space adequate to accommodate a heavy load in the vehicle, when such the load is to be put thereon.

An example of this type conventional rear seat is disclosed in the Japanese Utility Model Publication No. Hei 7-27239 (1996) in which there is a lack of a means for providing passengers with the comfortable rear seat. The conventional rear seat includes a mechanism for tilting the seat back in a full-flat state so that the passenger sitting in the rear seat can spend a relaxed time in the vehicle. However, it has been experienced that a person sitting in a front seat can not meet the passenger sitting in the rear seat in a face to face relation, or even if the passengers sitting in the front seat and the rear seat can face each other, there is a limitation of a space for stretching out their legs or a space for passenger sitting portion.

SUMMARY OF THE INVENTION

Therefore, it is an object of the present invention to provide a seat arrangement for vehicles in which passenger can sit in a state that they can stretch out their legs, and the passengers can take a nap in a full-flat state of the seat and use an enough space secured for their legs even when a front seat is rotated backwardly.

In order to achieve said object of the present invention, the technical step basically conceived of in the present invention is to provide the seat arrangement having an extra or space seat back which can be embedded or housed in a recess provided on the vehicle floor and upright with respect to the vehicle floor.

To accomplish the above-mentioned and other objects, there is provided a seat arrangement for vehicles which comprises a seat having a seat cushion adapted to be secured to a vehicle floor and a seat back arranged at the rear portion of the seat cushion, and an extra seat back located backward of the seat and embedded in a recess formed on a luggage floor of the vehicle, the extra seat back being able to be upright with respect to the luggage floor.

BRIEF DESCRIPTION OF THE DRAWING

The present invention will be understood more fully from the detailed description including appended claims given herebelow and from the accompanying drawings of the preferred embodiments of the present invention, wherein:

DETAILED DESCRIPTION OF THE PREFERRED EMBODIMENT

Figure 1:
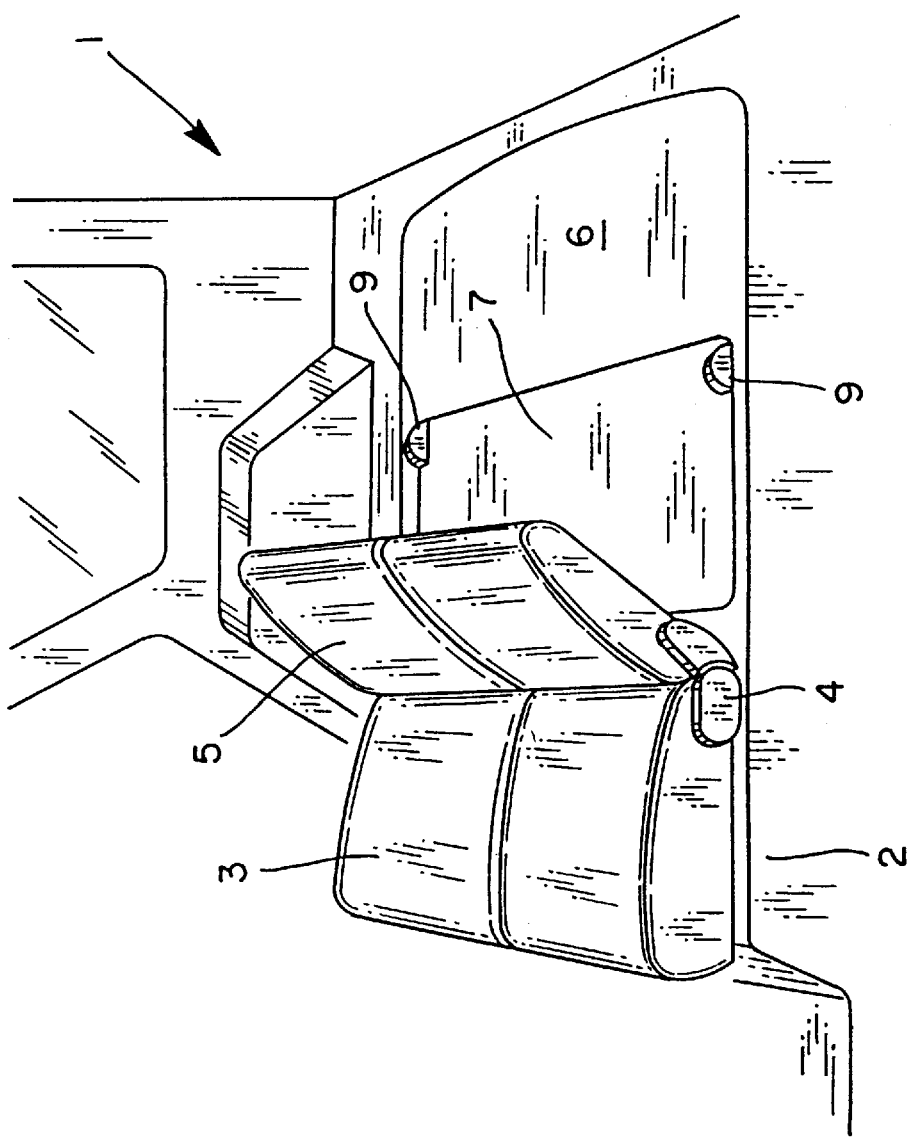
FIG. 1 is a perspective view of a seat arrangement of the present invention.

As shown in FIG. 1, a seat arrangement 1 according to an embodiment of the present invention includes a regular seat formed by a seat cushion 3 adapted to be secured on a vehicle floor 2 and a main seat back 5 connected to the seat cushion 3 through a conventional reclining mechanism, and an extra or spare seat back 7 which can be embedded or housed in a recess 8 formed on a luggage floor 6 of a van type vehicle.

Figure 2:
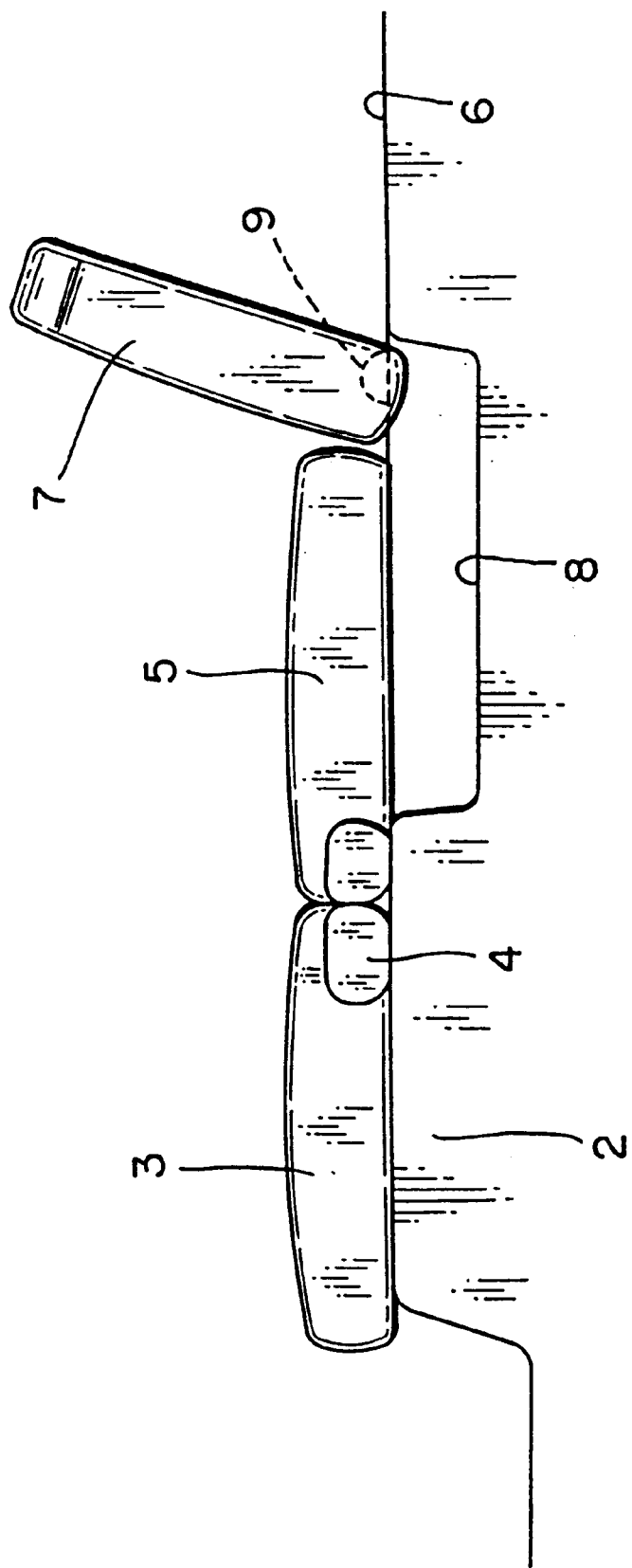
FIG. 2 is a side view of the seat arrangement wherein a seat back is folded rearwardly and an extra seat back is upright with respect to a vehicle floor.

FIG. 2 shows a state where the main seat back 5 is tilted backwardly in a full-flat state to cover an opening of the recess 8 and the extra seat back 7 is upright with respect to the luggage floor 6 by means of an adjustable reclining mechanism 9 which can select one of three positions of the extra seat back 7, namely a first position that the extra seat back 7 is embedded in the recess 8 of the luggage floor 6, a second position that the extra seat back 7 is upright and a third position that the extra seat back 7 is folded in a full-flat state.

Figure 3:
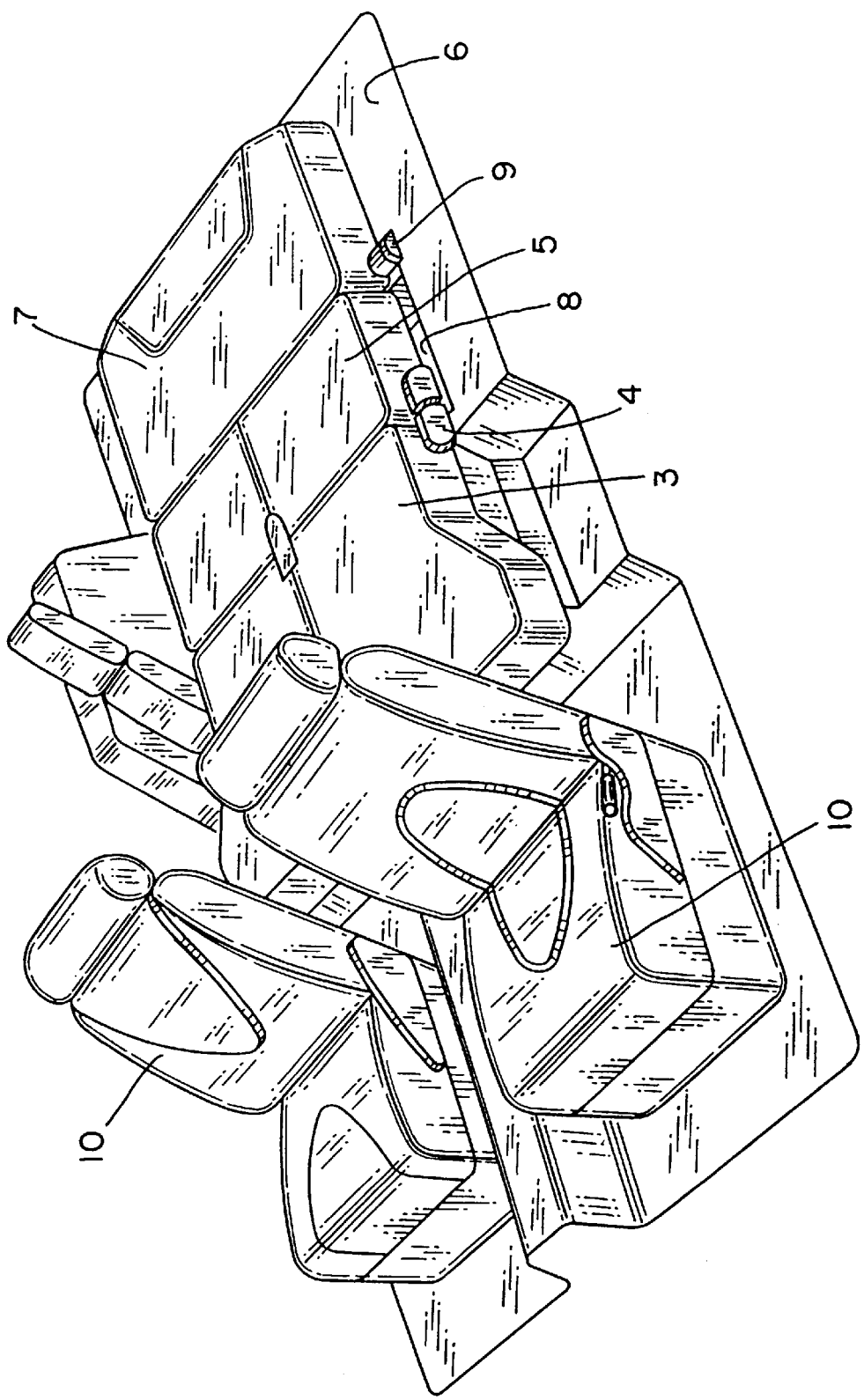
FIG. 3 is a perspective view of the seat arrangement wherein the extra seat back is tilted in a full-flat state.

FIG. 3 shows the full-flat state of the extra seat back 7 where the passenger is suitable to take a nap. When front seats 10, 10 each is rotated backwardly, respectively, an adequate space for stretching out passenger's legs is secured between the front seats 10, 10 and the rear seat 3, 5, generally of the bench type. One of the front seats 10, 10 is a driver's seat upon which a driver sits.

Figure 4:
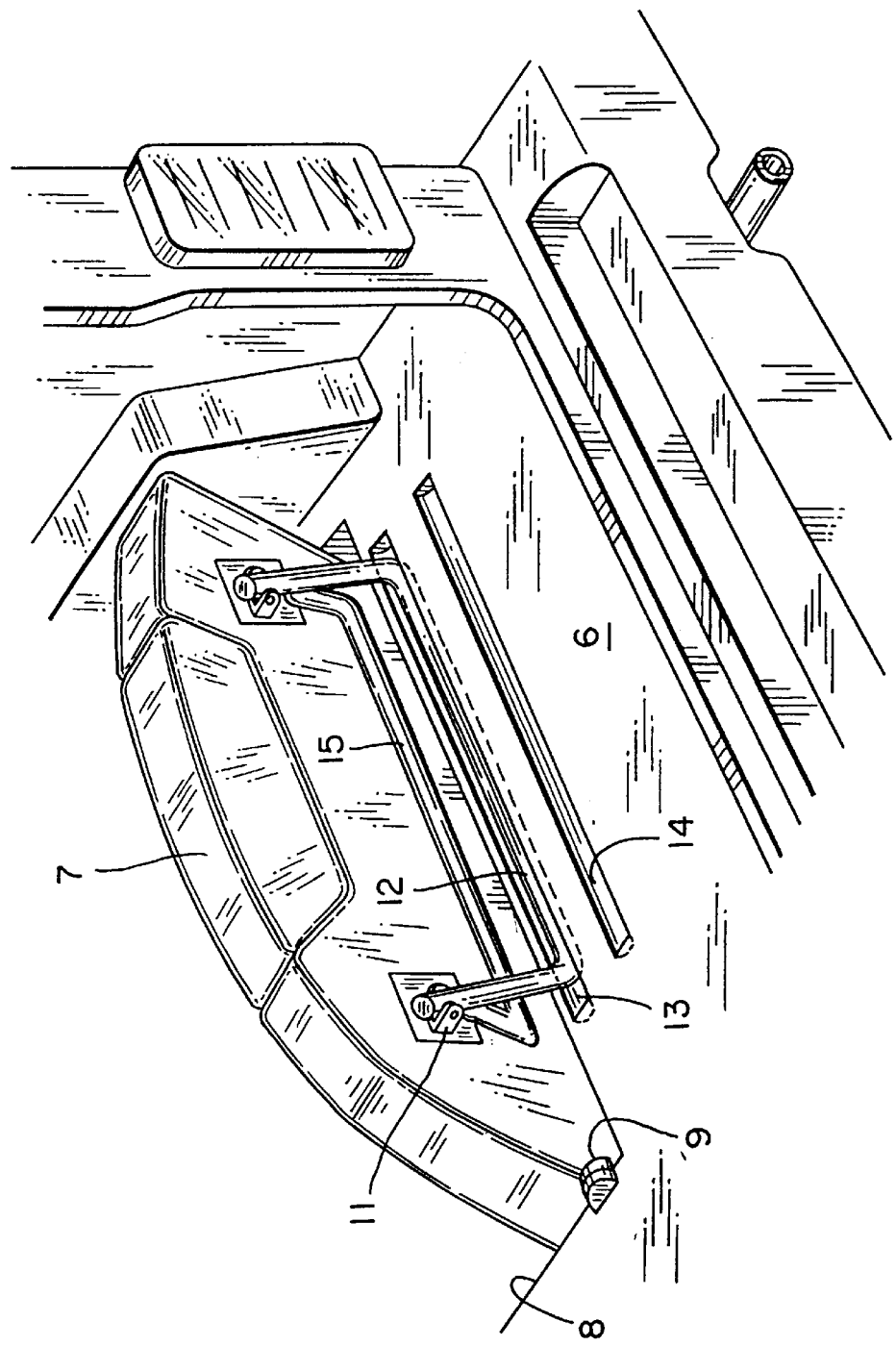
FIG. 4 is a perspective view showing a rear structure of the extra seat back.

As shown in FIG. 4, the extra seat back 7 may be provided at its rear surface with a U-shaped stay 12 of which both ends are pivoted to brackets 11, 11, respectively which are fixed to the rear surface of the extra seat back 7. The horizontal portion of the stay 12 is housed in any one of grooves 13, 14 formed on the luggage floor 6 when the extra seat back 7 is upright. The extra back seat 7 has a groove 15 of which shape corresponds to that of the stay 12 so that the stay 12 is received in the groove 15 when the extra seat back 7 takes the full-flat state of FIG. 3 and the embedded state of FIG. 1.

As many apparently widely different embodiments of the present invention can be made without departing from the spirit and scope thereof, it is to be understood that the invention is not limited to the specific embodiments thereof except as defined in the appended claims.

What is claimed is:

1. A seat arrangement comprising in combination a vehicle body having a floor, a seat assembly and an additional seat back, the floor having an upper surface and being provided with a recess having an opening, said seat assembly including a seat cushion and a seat back that is mounted for tilting movement with respect to the seat cushion to be positioned in a flat position in which the seat back of the seat assembly covers the opening of the recess, and including a stay for maintaining the additional seat back in an upright position with respect to the floor, the additional seat back being mounted for tilting movement between a first position in which the additional seat back is housed in the recess so that an upper surface of the additional seat back is flush with the upper surface of the floor, a second position in which the additional seat back is maintained in the upright position with respect to the floor by the stay, and a third position in which the additional seat back is positioned in a full-flat state and with the opening of the recess being covered by the seat back of the seat assembly.

2. A seat arrangement according to claim 1, wherein the floor is used for receiving luggage when the additional seat back is housed in the recess.

3. A seat arrangement according to claim 1, wherein when the additional seat back is in the second position, the opening of the recess is covered with the seat back of the seat assembly.

4. A seat arrangement comprising in combination a vehicle body having a floor, a seat assembly mounted on the floor and an additional seat back mounted on the floor, the floor having an upper surface and being provided with a recess having an opening, said seat assembly including a seat cushion and a seat back that is mounted for tilting movement with respect to the seat cushion between an inclined position in which the seat back of the seat assembly is inclined with respect to the seat cushion and a flat position in which the seat back of the seat assembly covers the opening of the recess, the additional seat back being mounted to tilt with respect to the floor between a first position in which the additional seat back is housed in the recess so that an upper surface of the additional seat back is flush with the upper surface of the floor and a second position different from the first position in which the additional seat back is positioned in a full-flat state at the same time as the seat back of the seat assembly is positioned in said flat position to cover the opening of the recess.

5. A seat arrangement according to claim 4, including a stay operatively associated with said additional seat back to maintain said additional seat back in an inclined position with respect to the floor.

6. A seat arrangement according to claim 4, wherein when the additional seat back is in the inclined position, the opening of the recess is covered with the seat back of the seat assembly.

7. A seat arrangement according to claim 4, including a seat positioned forwardly of the seat assembly.

* * * * *